United States Patent
Furusawa et al.

(10) Patent No.: US 12,192,032 B2
(45) Date of Patent: Jan. 7, 2025

(54) COMMUNICATION SYSTEM AND COMMUNICATION METHOD

(71) Applicant: NIPPON TELEGRAPH AND TELEPHONE CORPORATION, Tokyo (JP)

(72) Inventors: Kazuhisa Furusawa, Musashino (JP); Takahiro Kubo, Musashino (JP); Shinichi Yoshihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 418 days.

(21) Appl. No.: 17/596,371

(22) PCT Filed: Jun. 13, 2019

(86) PCT No.: PCT/JP2019/023568
§ 371 (c)(1),
(2) Date: Dec. 8, 2021

(87) PCT Pub. No.: WO2020/250396
PCT Pub. Date: Dec. 17, 2020

(65) Prior Publication Data
US 2022/0224562 A1 Jul. 14, 2022

(51) Int. Cl.
*H04B 10/275* (2013.01)
*H04B 10/2575* (2013.01)
(Continued)

(52) U.S. Cl.
CPC ....... *H04L 12/43* (2013.01); *H04B 10/25753* (2013.01); *H04L 2012/421* (2013.01)

(58) Field of Classification Search
CPC .. H04B 10/035; H04B 10/0771; H04B 10/27; H04B 10/2755; H04B 2210/078
See application file for complete search history.

(56) References Cited

U.S. PATENT DOCUMENTS 6,414,768 B1 * 7/2002 Sakata ............... H04B 10/27
398/59
7,054,562 B1 * 5/2006 Balakrishnan ...... H04J 14/0283
398/83
(Continued)

FOREIGN PATENT DOCUMENTS

JP H02290348 A 11/1990
JP H11275028 A 10/1999
(Continued)

OTHER PUBLICATIONS

IEEE Computer Society, "IEEE802.3ah-2004: 64. Multi-point MAC Control". Sep. 7, 2004.
(Continued)

*Primary Examiner* — Tanya T Motsinger

(57) ABSTRACT

An object of the present invention is to provide a communication system and a communication method that can suppress an increase in the total fiber distance even if the number of secondary devices increases and that can make complex processing for band allocation for uplink optical signals unnecessary. The configuration of the communication system according to the present invention is a mixture of a ring type and a branch type, in which an optical fiber cable (primary path) from a communication station to each user's home is arranged in a ring (loop) shape, and the primary path is branched and laid to the user's home. Furthermore, unidirectional communication is enabled by a ring-type primary path, and the transmittable amount can be made uniform by further combining time division multiplexing.

8 Claims, 13 Drawing Sheets

(51) Int. Cl.
*H04L 12/43* (2006.01)
*H04L 12/42* (2006.01)

(56) References Cited

U.S. PATENT DOCUMENTS

| | | | | |
|---|---|---|---|---|
| 7,369,769 | B2* | 5/2008 | Yang | H04Q 11/0067 398/4 |
| 10,038,946 | B2* | 7/2018 | Smolorz | H04B 10/2581 |
| 10,594,430 | B1* | 3/2020 | Scott | H04J 14/021 |
| 11,454,859 | B1* | 9/2022 | Cho | G02F 1/2955 |
| 2002/0163695 | A1* | 11/2002 | Unitt | H04L 12/2801 398/100 |
| 2003/0002104 | A1* | 1/2003 | Caroli | H04J 14/0213 398/82 |
| 2003/0137975 | A1* | 7/2003 | Song | H04J 3/0652 370/465 |
| 2005/0062460 | A1* | 3/2005 | Blake | H04Q 9/00 324/96 |
| 2007/0140288 | A1* | 6/2007 | Boyd | H04Q 11/0067 370/442 |
| 2017/0324480 | A1* | 11/2017 | Elmirghani | H04J 14/0256 |
| 2019/0020419 | A1* | 1/2019 | Pelc | H04B 10/5561 |
| 2019/0207702 | A1* | 7/2019 | van Veen | H04B 10/503 |
| 2020/0036487 | A1* | 1/2020 | Hammond | H04L 5/0012 |
| 2021/0028857 | A1* | 1/2021 | Inuzuka | H04J 11/00 |
| 2021/0175699 | A1* | 6/2021 | Garrett | H02G 15/14 |
| 2021/0405499 | A1* | 12/2021 | Srinivasan | H04B 10/503 |
| 2022/0006530 | A1* | 1/2022 | Ngo | H04B 10/40 |
| 2022/0019023 | A1* | 1/2022 | Ren | H04B 10/505 |
| 2022/0269001 | A1* | 8/2022 | Oguma | G02B 6/29358 |

FOREIGN PATENT DOCUMENTS

| | | |
|---|---|---|
| JP | 2004534437 A | 11/2004 |
| JP | 2008294851 A | 12/2008 |
| JP | 2018107520 A | 7/2018 |
| JP | 201950509 A | 3/2019 |

OTHER PUBLICATIONS

NTT Access Network Service Systems Laboratories, NTT Corporation, "Basic Technology Course [GE-PON Technology] 2nd IEEE802.3ah Standard", NTT Technology Journal. Sep. 2005. pp. 91-94.

* cited by examiner

[1]

[2]

[3]

[8]

(A)

(B)

◯ : PRIMARY DEVICE
☐ : SECONDARY DEVICE (A)

(B)

COMMUNICATION SYSTEM AND COMMUNICATION METHOD

CROSS-REFERENCE TO RELATED APPLICATIONS

This application is a 371 U.S. National Phase of International Application No. PCT/JP2019/023568 filed on Jun. 13, 2019. The entire disclosures of the above applications are incorporated herein by reference.

TECHNICAL FIELD

The present disclosure relates to a communication network that connects a telecommunication company building (communication station) to a user's home in optical communication.

BACKGROUND ART

FIG. 1 is a diagram illustrating a mode of an optical communication system. A communication device installed in a communication station is referred to as a "primary device", and a communication device installed in a user's home is referred to as a "secondary device". The optical communication system uses an "uplink optical signal", which is sent from each secondary device to the primary device, and a "downlink optical signal", which is sent from the primary device to the secondary device.

PONs (Passive Optical Networks), such as those shown in FIGS. 2 and 3, are widely used as optical communication systems that connect telecommunication company buildings (communication stations) to user's homes (e.g., see NPL 1). In a PON, the primary device is an OLT (Optical Line Terminal) or an OSU (Optical Subscriber Unit), and the secondary device is an ONU (Optical Network Unit).

In a PON, to efficiently perform data communication, a double star type such as that shown in FIG. 2 is employed as a mode of optical fiber arrangement, and the optical fiber cable is branched using an optical splitter. Currently, the mainstream is to have four branches followed by eight branches, i.e., a maximum of 32 branches=32 secondary devices. As other topologies, bus PONs such as that shown in FIG. 3 are also used in railroads or the like.

Also, wavelength multiplexing is used, in which uplink optical signals and downlink optical signals are sent with different wavelengths to be superimposed on one core of an optical fiber. Furthermore, the PONs deliver the same content to all secondary devices with a downlink optical signal and allocate a transmission time to each secondary device such that the secondary device can efficiently send an uplink optical signal when necessary.

FIG. 4 is a sequence diagram illustrating automatic registration and delay measurement fora secondary device performed in a PON. Delays for each secondary device is also measured simultaneously in order to prevent collisions of uplink optical signals (e.g., see NPL 2). The procedure is as follows.

(1) Issue an Investigation from the Primary Device
  Give "an investigation instruction to report if unregistered" as a downlink optical signal
(2) Report from an Unregistered Secondary Device
  The unregistered secondary device receives the "instruction" with respect to the aforementioned investigation instruction
  Set a random delay time
  After waiting for the delay time, report the unregistered state together with a random delay time amount
  At this time, synchronize the time with the primary device based on signal information from a primary signal
(3) Register the Secondary Device at the Primary Device
  Select an available number in a secondary device registration table based on the unregistered state report from the secondary device, and deliver a "secondary device number (LLID in a PON) for this unregistered secondary device
(4) Register at the Secondary Device
  Register the "secondary device number" to the secondary device itself
(5) Uplink Optical Signal Instruction from the Primary Device to the Secondary Device
  Give an instruction to transmit an uplink optical signal of a certain length, after a lapse of a certain time
(6) Reply from the Secondary Device
  Transmit an uplink optical signal of the designated length after a lapse of the designated time, based on the instruction from the primary device
(7) Register at the Primary Device
  Receive a reply from the secondary device and complete registration After the step (7) as well, communication is performed using the "secondary device number" while regularly measuring the delay time and synchronizing the time between the primary device and the secondary device.

In a PON, the primary device dynamically controls band allocation for uplink optical signals is dynamically by adjusting the timing at which an uplink optical signal can be transmitted from each secondary device. Specifically, the delay time for each secondary device is acquired in advance, a transmission request from the secondary device and the traffic thereof are checked, and a transmission timing instruction is given from the primary device to the secondary device.

CITATION LIST

Non Patent Literature

[NPL 1] IEEE802.3ah, p. 421, pp. 440-442
[NPL 2] NTT GIJUTU Journal 2005.9, pp. 91-94

SUMMARY OF THE INVENTION

Technical Problem

In recent years, with the development of the IoT (Internet of Things), more and more users are demanding lower prices for communication lines rather than higher speeds. As described above, double star PONs maintain optical fibers to user's homes, which increases the total fiber distance and management costs, especially as the number of secondary devices (ONUs) increases. In addition, it is difficult to reduce device costs due to performing complex processing to measure a delay time of each secondary device, calculate a timing of transmitting an uplink optical signal for each secondary device based on a transmission request from the secondary device, and give an instruction, for the purpose of bandwidth allocation for uplink optical signals. Thus, conventional PONs have a problem that it is difficult to reduce costs and provide low-cost communication lines.

To solve the foregoing problem, an object of the present invention is to provide a communication system and a communication method that can suppress an increase in the total fiber distance even if the number of secondary devices increases, and that can make complex processing for band allocation for uplink optical signals unnecessary.

Means for Solving the Problem

To achieve the above object, a communication system according to the present invention employs a ring optical fiber arrangement, and performs data communication by means of unidirectional communication and time division multiplexing.

Specifically, the communication system according to the present invention includes: a primary path having one first end and one second end; one primary device that transmits a downlink optical signal to the first end of the primary path, and receives an uplink optical signal together with the downlink optical signal from the second end of the primary path; at least one secondary device that receives the downlink optical signal, and transmits the uplink optical signal; and a secondary path that diverts the downlink optical signal from the primary path to the secondary device, and merges the uplink optical signal from the secondary device into the primary path.

A communication method according to the present invention includes: transmitting a downlink optical signal to a first end of a primary path, by one primary device; receiving the downlink optical signal from the primary path, and transmitting an uplink optical signal corresponding to the downlink optical signal to the primary path, by at least one secondary device connected to the primary path; and receiving the uplink optical signal together with the downlink optical signal from the second end of the primary path, by the primary device.

As shown in FIG. 5, the configuration of the present communication system is a mixture of a ring type and a branch type, in which an optical fiber cable (primary path) from a communication station to each user's home is arranged in a ring (loop) shape, and the primary path is branched and laid to the user's home. Also, a configuration in which the primary path does not pass through users' homes is employed so as not to be affected by a failure or the like occurring at the devices at the users' homes. This configuration can suppress an increase in the optical fiber distance due to an increase in the number of secondary devices and can reduce costs while making the optical fiber configuration in the communication system flexible. Furthermore, unidirectional communication is enabled by a ring-type primary path, and the transmittable amount can be made uniform by further combining time division multiplexing. As a result, a simple configuration can be realized in which complex processing such as delay measurement, transmission request, and transmission permission are not required, and costs and power consumption can be reduced.

Accordingly, the present invention can provide a communication system and a communication method that can suppress an increase in the total fiber distance even if the number of secondary devices increases and that can make complex processing for band allocation for uplink optical signals unnecessary.

The primary path of the communication system according to the present invention branches into a plurality of paths between the first end and the second end, and the branched paths merge into one again. The primary path may have a plurality of routes as shown in FIG. 6.

The primary path and the secondary path of the communication system according to the present invention are connected by an optical coupler. The loss between the primary path and the secondary path can be reduced.

The primary path of the communication system according to the present invention has, at a portion thereof, an optical fiber amplifier. The number of connectable secondary devices can be increased, and the primary path can be extended.

With one cycle being a time including a transmission time for transmitting, as the downlink optical signal, data addressed to each secondary device and data addressed to every secondary device in time division multiplexing, a reception time frame for receiving, as the uplink optical signal, data from the secondary device, and a guard time arranged between receiving time frames, the primary devices of the communication system according to the present invention causes the secondary device to transmit data in the reception time frame allocated thereto.

The primary device of the communication system according to the present invention regularly performs discovery to newly register the secondary device that is unregistered.

The primary device and the secondary device of the communication system according to the present invention adjust reception gain based on the uplink optical signal and the downlink optical signal, respectively.

Note that the above inventions can be combined to the extent possible.

Effects of the Invention

The present invention can provide a communication system and a communication method that can suppress an increase in the total fiber distance even if the number of secondary devices increases and that can make complex processing for band allocation for uplink optical signals unnecessary.

BRIEF DESCRIPTION OF DRAWINGS

FIG. 17 is a diagram illustrating a secondary device included in the communication system according to the present invention.

DESCRIPTION OF EMBODIMENTS

Embodiments of the present invention will be described with reference to the attached drawings. The embodiments described below are examples of the present invention, and the present invention is not limited to the following embodiments. Note that constituent elements with the same reference signs in the specifications and the drawings are identical to each other.

Embodiment 1

Figure 1:
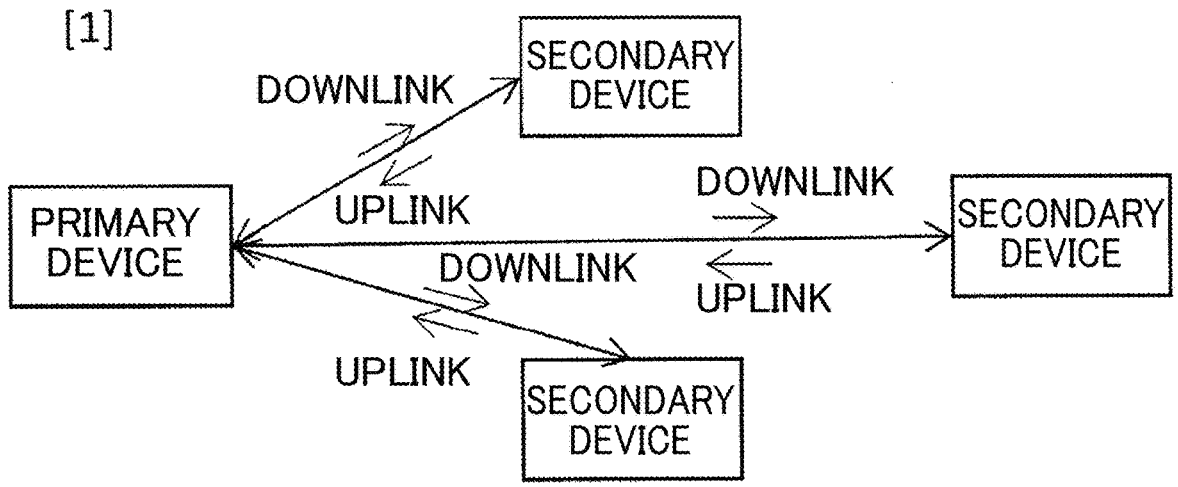
FIG. 1 is a diagram illustrating a mode of an optical communication system.
Figure 2:
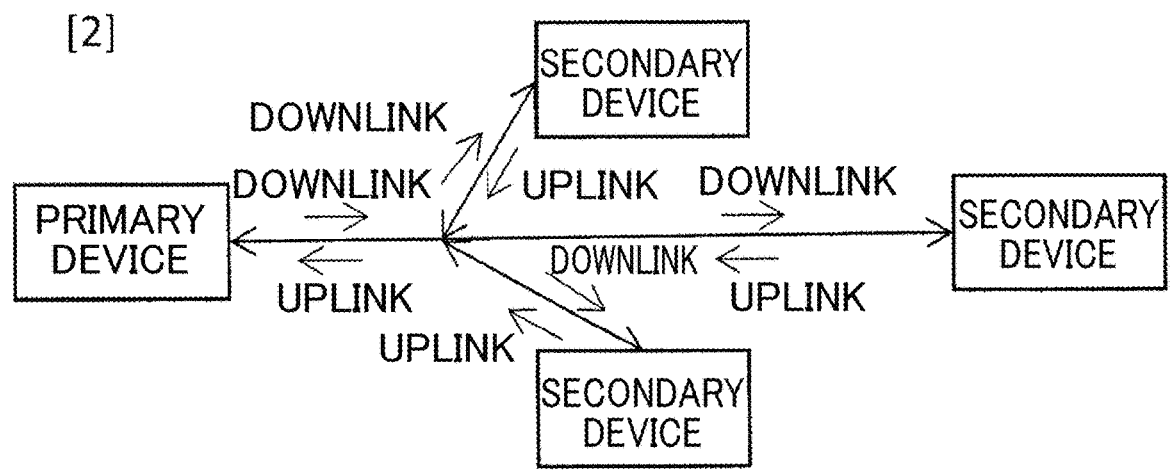
FIG. 2 is a diagram illustrating a mode of the optical communication system.
Figure 3:
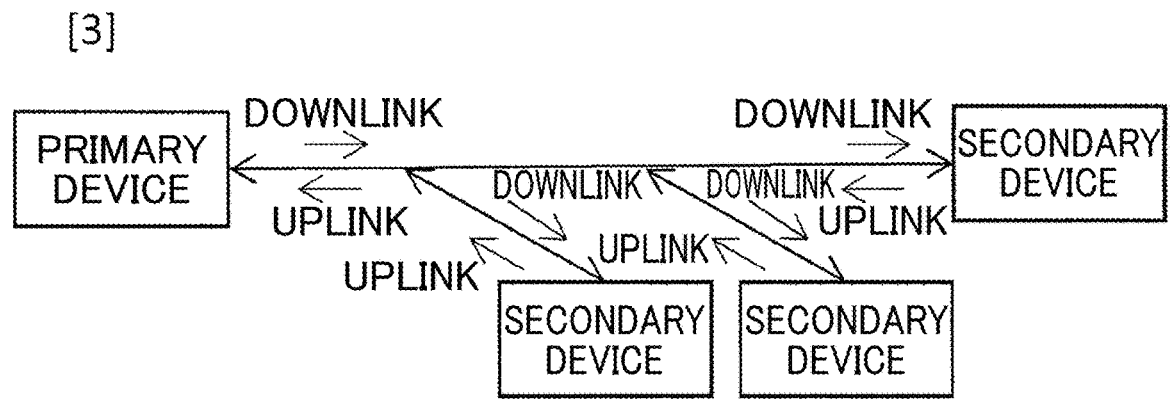
FIG. 3 is a diagram illustrating a mode of the optical communication system.
Figure 4:
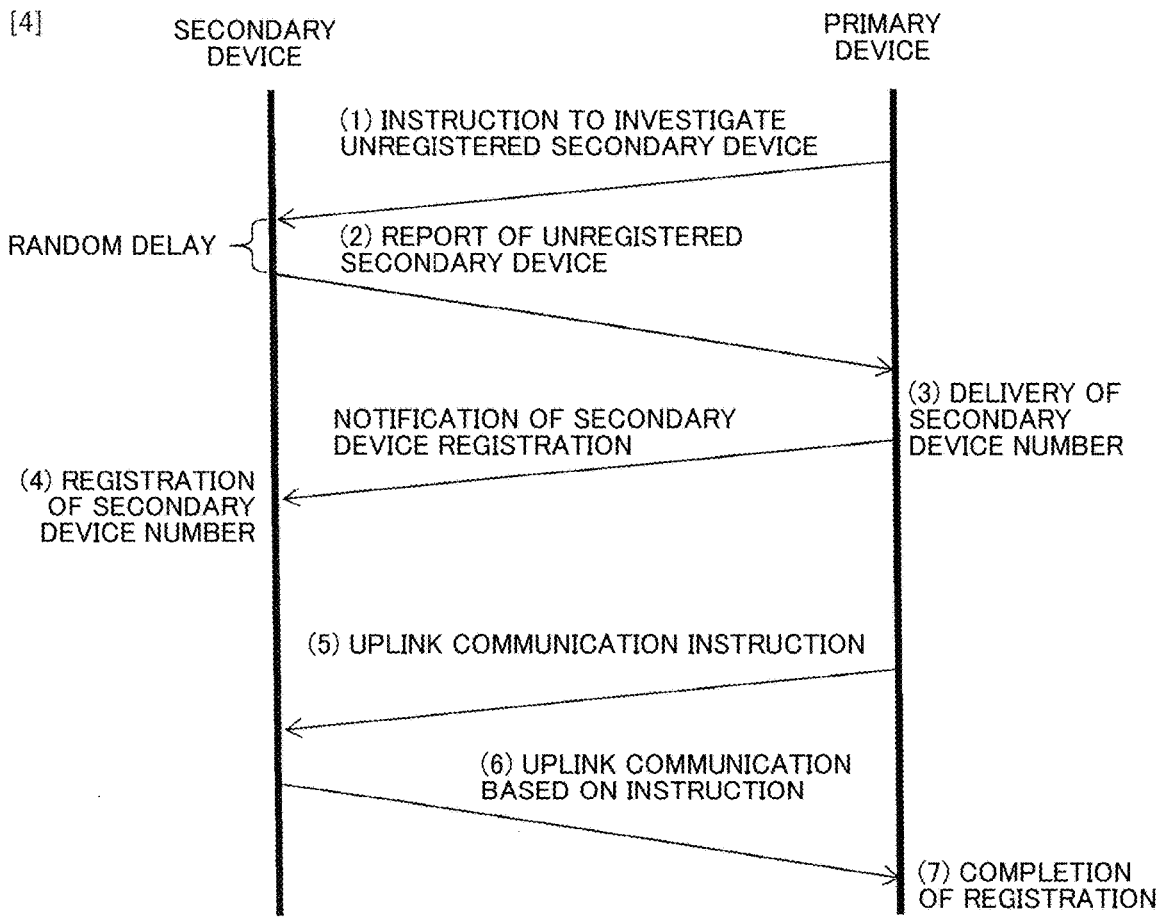
FIG. 4 is a sequence diagram illustrating automatic registration and delay measurement for a secondary device that are performed in the optical communication system.
Figure 5:
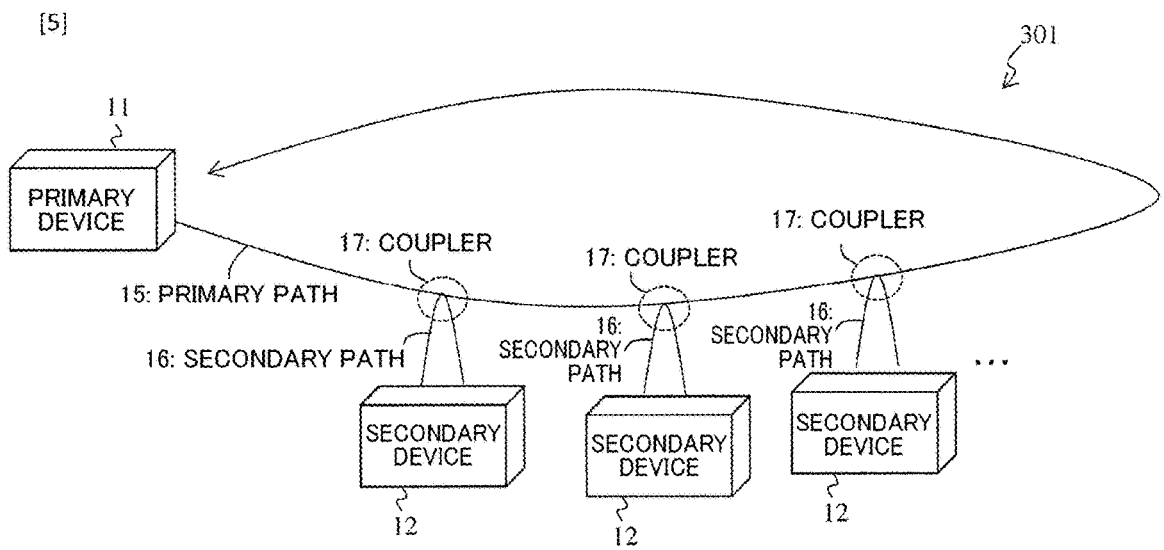
FIG. 5 is a diagram illustrating the communication system according to the present invention.

FIG. 5 is a diagram illustrating a communication system 301 of the present embodiment. The communication system 301 includes a primary path 15 that has one first end and one second end, one primary device 11, at least one secondary device 12, and a secondary path 16. Here, the primary device 11 transmits a downlink optical signal to the first end of the primary path 15, and receives an uplink optical signal together with the downlink optical signal from the second end of the primary path 15. The secondary device 12 receives the downlink optical signal and transmits the uplink optical signal. The secondary path 16 diverts the downlink optical signal from the primary path 15 to the secondary device 12, and merges the uplink optical signal from the secondary device 12 into the primary path 15.

Figure 7:
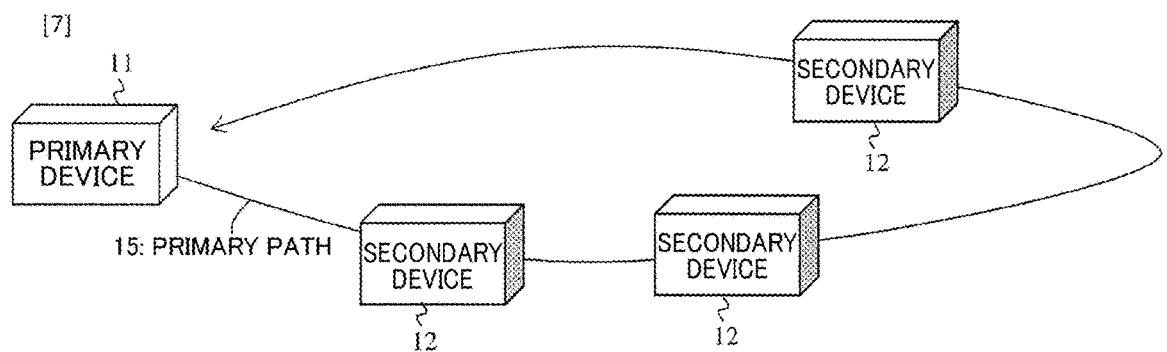
FIG. 7 is a diagram illustrating a mode of the optical communication system.

A ring (loop) type rather than a star type is employed as a mode of optical fiber arrangement from a communication station to a user's home, and it is thus possible to take the shortest route between devices and shorten the necessary optical fiber distance. The ring type optical fiber arrangement mode further has a configuration in which the primary path passes through the secondary device 12 as shown in FIG. 7, and a configuration that includes a branched path (secondary path 16) to the secondary device 12 and a path (primary path 15) that does not pass through the secondary device as shown in FIG. 5.

The configuration in FIG. 5 can avoid influence of addition or deletion of a secondary device 12 or a failure thereof on the entire communication system, as a result of the primary path 15 serving as a bypass. In an actual construction mode employed by telecommunication carriers, an underground pipe or a telephone pole is used as the primary path 15, and the secondary path 16 to the user's home is a lead-in cable from the nearest telephone pole. Accordingly, the maintainability of the communication system can be enhanced as a result of an active device to which electric power needs to be supplied being installed in the communication station or the user's home, and only a passive device to which electric power does not need to be supplied being installed in a conduit or a telephone pole.

Figure 8:
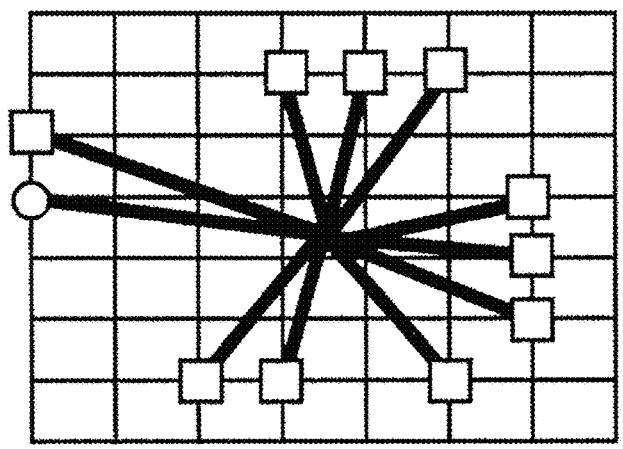
FIG. 8 illustrates effects of the communication system according to the present invention.
Figure 8:
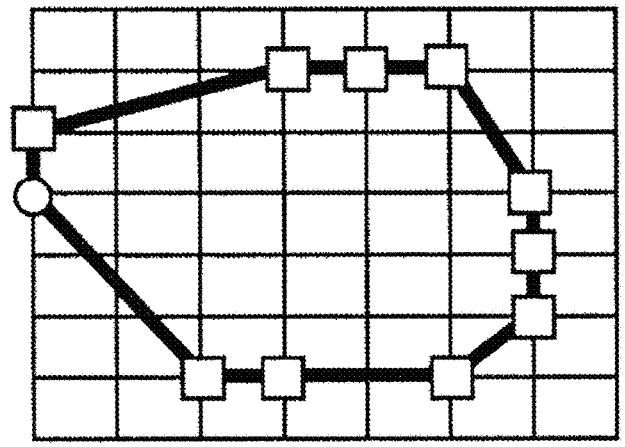

FIG. 8 illustrates that the ring type optical communication system of the present embodiment has a shorter fiber distance than that of a double star PON. As the number of secondary devices increases, the overall fiber distance in the ring type is often shorter than that of the PON. In FIG. 8, the vertical and horizontal length of one box is "1". In the case of the PON in FIG. 8(A), the optical fiber distance from the primary device to all (10) secondary devices is 31.6. Meanwhile, in the case of the ring type in FIG. 8(B), the optical fiber distance from the primary device to all (10) secondary devices is 18.42.

In addition, in the case of PONs of the star type and the bus type, two cores or two wavelengths are required for uplink and downlink communication, whereas, in the case of the ring type, uplink and downlink communication can be performed with one core and one wavelength by employing unidirectional communication, as will be described later.

[Optical Coupler]

Figure 9:
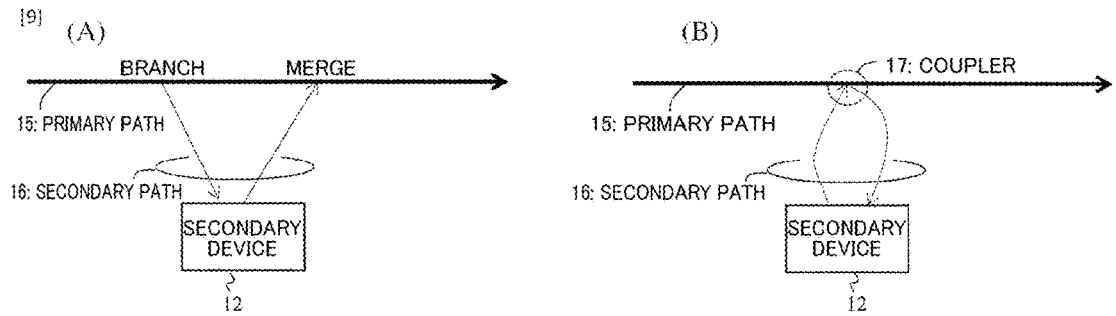
FIG. 9 illustrates a structure of the communication system according to the present invention.

Here, it is preferable that the primary path 15 and the secondary path 16 are connected by an optical coupler 17. The mode of branching and merging between the primary path 15 and the secondary path 16 includes not only a mode of branching and merging at two points as shown in FIG. 9(A), but also a mode of arranging a two-input/two-output optical coupler 17 as shown in FIG. 9(B). In the mode in FIG. 9(B), the total loss at connection points is smaller than that in the mode in FIG. 9(A), and more secondary devices can be connected than in the mode in FIG. 9(A), or the secondary device can be connected farther than in the mode in FIG. 9(A). In the present embodiment, since a guard time is provided and unnecessary signals are discarded as will be described later, a problem due to collisions and return communication at merging points does not occur.

[Subring Configuration]

Figure 6:
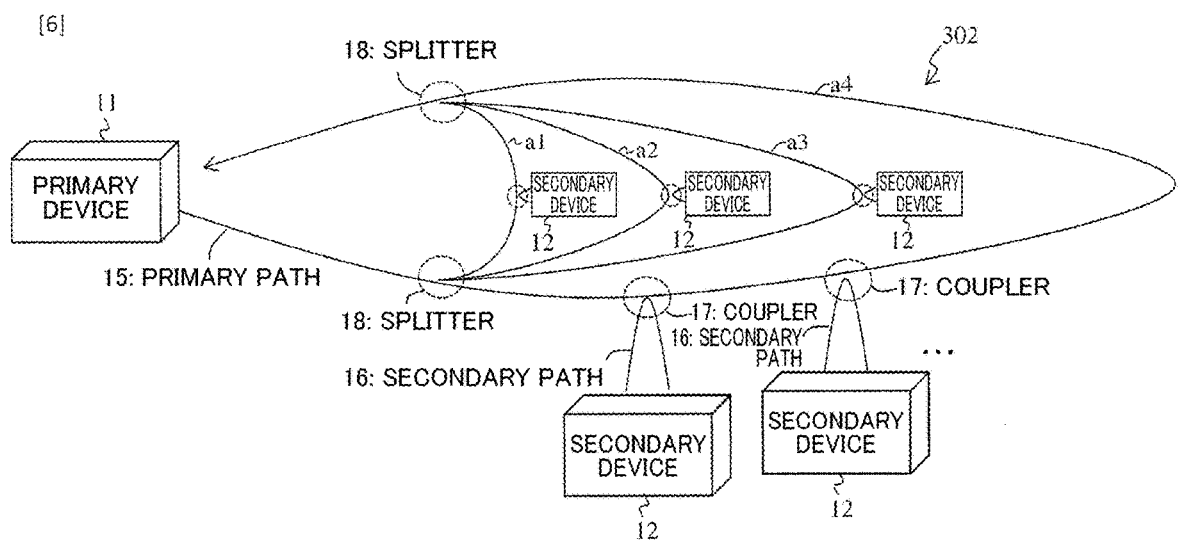
FIG. 6 is a diagram illustrating the communication system according to the present invention.

A configuration may be employed in which the primary path 15 is branched into a plurality of paths (a1 to a4) between the first end and the second end and the branched paths merge into one again, as in a communication system 302 in FIG. 6. The flexibility of the optical fiber arrangement can be enhanced by not only using one simple ring type configuration as in a communication system 301 in FIG. 5, but also configuring branch routes using splitters 18.

In the communication system 302, the primary path 15 is branched at intermediate points by the splitters 18, the secondary device 12 is connected to the branched path (hereinafter, a "subring"), and the subring is merged into the primary path 15. Although the secondary device 12 is connected to the subring after being branched in FIG. 6, the secondary device can also be connected to the primary path before being branched into the subring. The configuration of the communication system 302 can increase the number of secondary devices that can be accommodated by one primary device, and can realize a further cost reduction.

Here, a description will be given of an example in which the communication system 302 can further increase the number of secondary devices that can be accommodated than the communication system 301. As a prerequisite, it is assumed that the primary and secondary devices of the communication system have the output/reception capability that withstands 25 dB of transmission loss, the loss of a 2×2 optical coupler 17 that branches/merges at a ratio of 90:10 is 0.8 dB/11 dB, and the loss of a 1×4 optical splitter 18 is 7.4 dB.

In the case of the communication system 301 in FIG. 5, when the number of secondary devices 12 is 18, the reception at the secondary device 12 farthest from the primary device 11 is 0.8×17+11=24.6 dB (<25 dB), and the return to the primary device 11 is 0.8×18=14.4 dB (<25 dB).

That is to say, in the communication system 301, the above condition can be satisfied if the number of secondary devices 12 is up to 18.

Meanwhile, in the case of the communication system 302 in FIG. 6, when the number of secondary devices 12 is 36 (nine secondary devices per subring), the reception at the secondary device 12 farthest from the primary device 11 is 7.4+0.8×8+11=24.8 dB (<25 dB), and the return to the primary device 11 is 7.4+0.8×9+7.4=22 dB (<25 dB).

That is to say, in the communication system 302, the above condition can be satisfied if the number of secondary devices 12 is up to 36, and more secondary devices can be connected than in the communication system 301.

If the optical splitters 18 are arranged when the communication system is constructed, it is possible to suppress the extent of influence exerted to communication when a subring is added or when an optical coupler for adding a secondary device to a subring is inserted.

In the communication system 302, uplink optical signals do not collide at a confluence because of a guard time or the like, as will be described later. However, in the communication system 302, there is a possibility that downlink optical signals collide at a subring confluence. There is also a method of adjusting timings by, for example, intentionally causing a delay to avoid collisions. Meanwhile, as a method for avoiding collisions at low cost, only uplink optical signals may be received at the primary device 15. The secondary device 12 may give an identifier only to uplink signals, and the primary device 15 may discard signals without the identifier (downlink signals that may collide).

[Direction of Communication]

In the case of the ring type communication, two types of methods are conceivable; namely, a method of communicating uplink optical signals and downlink optical signals respectively in opposite directions (bidirectionally), and a method of communicating these signals unidirectionally. In the case of bidirectional communication, a method of preparing optical fiber cables for uplink and downlink communication (a total of two optical fiber cables) or a method of performing wavelength multiplexing with different wavelengths for uplink and downlink communication is available, but these methods are costly.

In the communication system (301, 302), unidirectional communication is performed to emphasize cost reduction rather than simultaneous traffic (speed). By performing unidirectional communication, it is possible to avoid the loss at the time of wavelength multiplexing, increase the number of secondary devices, and extend the installation distance.

[Optical Amplifier]

Figure 10:
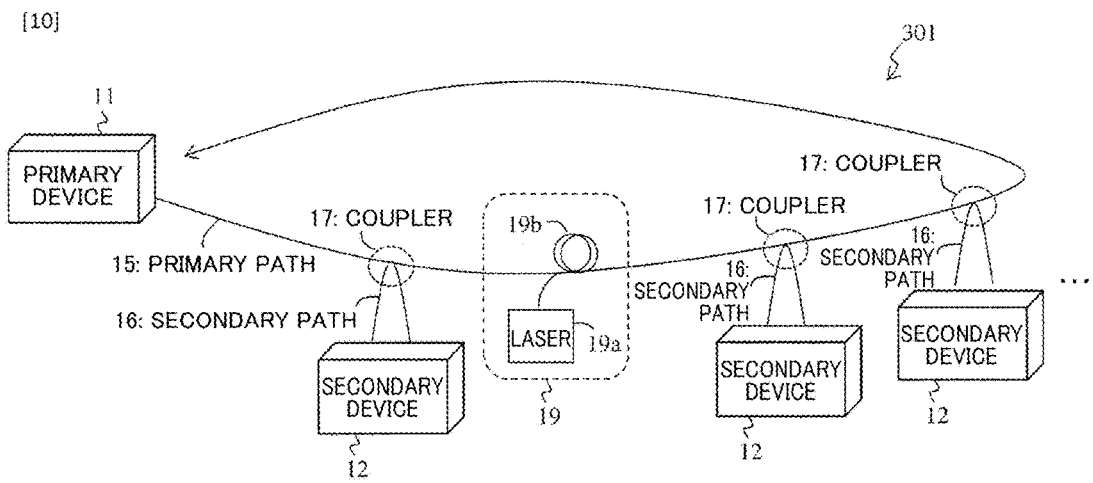
FIG. 10 is a diagram illustrating the communication system according to the present invention.

The primary path 15 in the communication system (301, 302) may have, at a portion thereof, an optical fiber amplifier. FIG. 10 is a diagram illustrating an optical communication system 301 that has an optical amplifier 19. The optical amplifier 19 has a fiber amplifier 19b and a laser 19a that excites the fiber amplifier 19b. The fiber amplifier 19b is a part of the primary path 15. The optical amplifier 19 can increase the number of secondary devices and extend the installation distance. In the optical communication system 301 in FIG. 10, the optical amplifier 19 is arranged that does not convert light to electricity or electricity to light. Therefore, even if the optical amplifier 19 fails, the influence on the entire communication network can be reduced.

Figure 11:
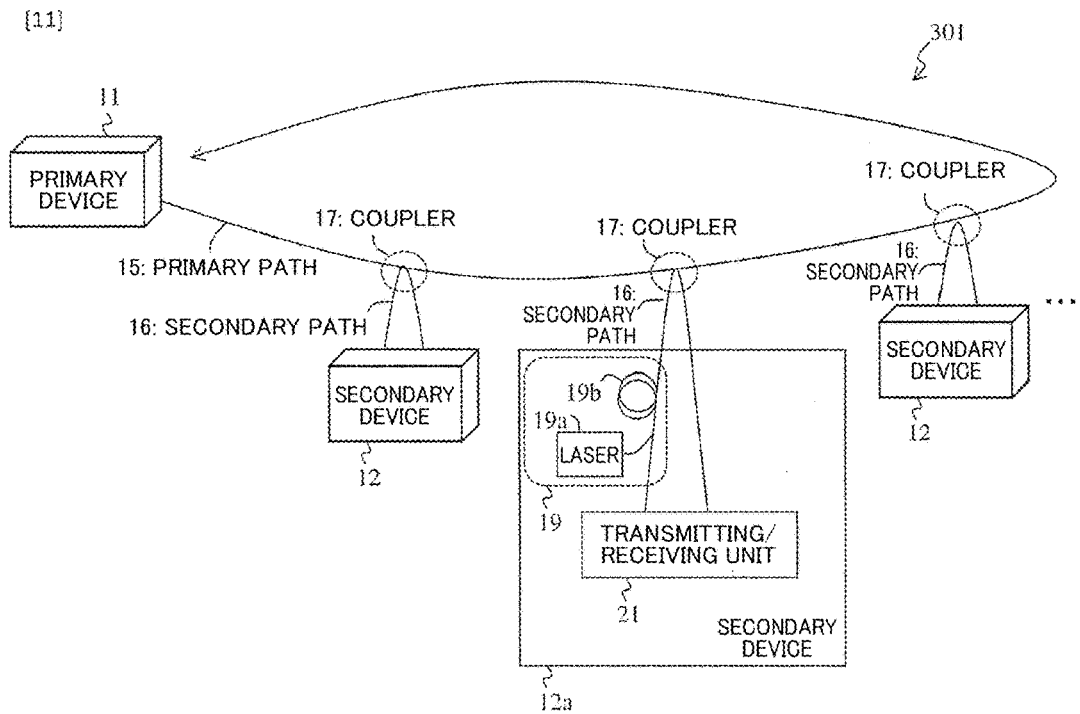
FIG. 11 is a diagram illustrating the communication system according to the present invention.

FIG. 11 is a diagram illustrating automatic a secondary device 12a that contains the optical amplifier 19. A transmitting/receiving unit 21 of the secondary device 12a has the function of the secondary device 12 that was described with reference to FIGS. 5 and 6. With the secondary device 12a, the optical amplifier 19 is arranged on the optical fiber cable of the secondary path 16 for communication.

Figure 12:
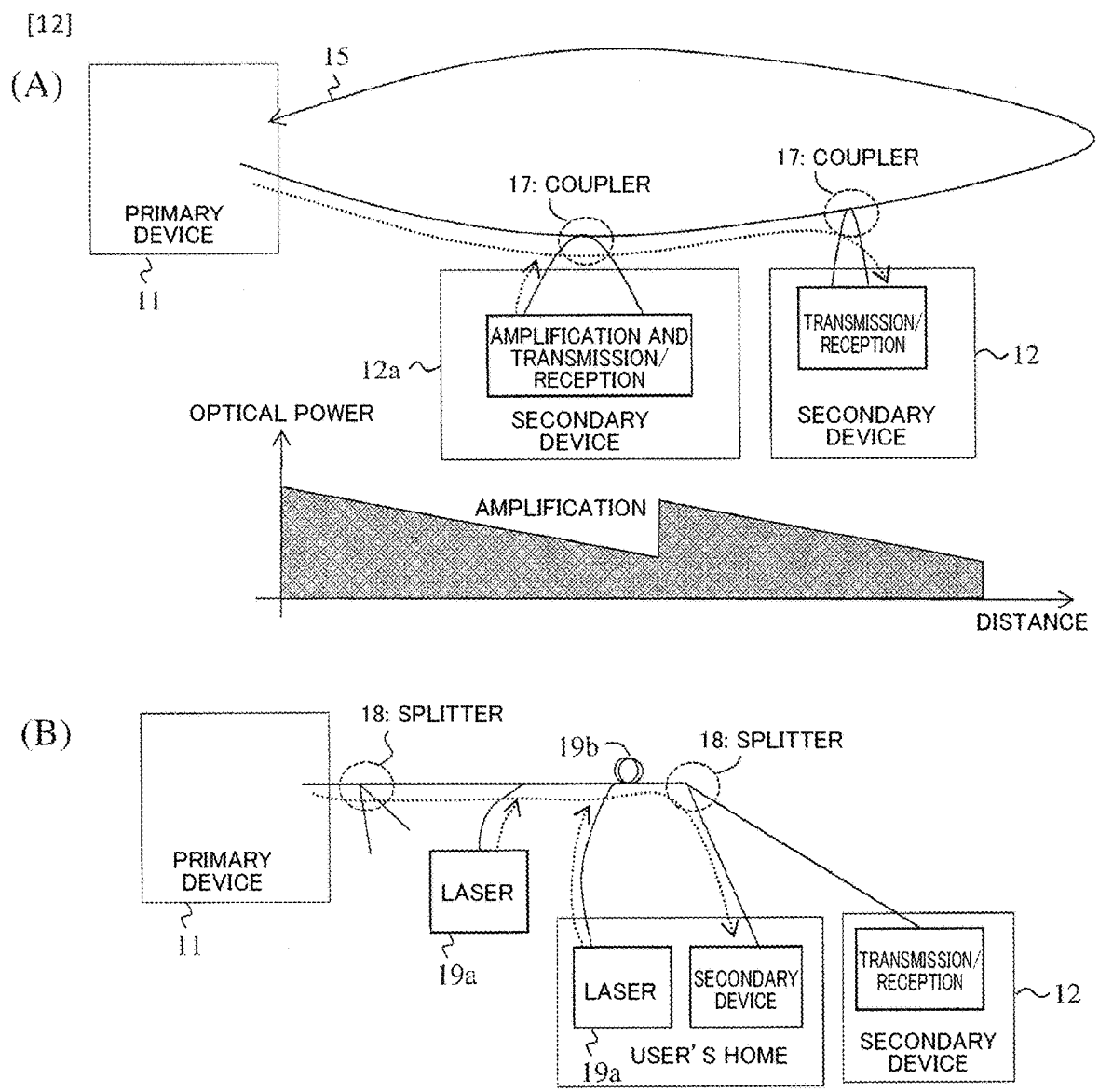
FIG. 12 illustrates effects of the communication system according to the present invention.

FIG. 12 illustrates a merit of arranging the secondary device 12a. FIG. 12(A) is a diagram illustrating the optical communication system 301 that includes the secondary device 12a. Although optical power attenuates as it goes away from the primary device 11, but it is possible to increase the number of secondary devices and extend the installation distance by amplifying the optical power at an intermediate point. By placing the secondary device and the amplifier at the same location (in the user's home) or arranging the integrated secondary device 12a, the installation distance can be extended without performing optical amplification power on a telephone pole, and the capability of the optical communication system 301 to accommodate the secondary devices can be enhanced. Accordingly, a cost reduction can be achieved.

FIG. 12(B) is a diagram illustrating the case of a PON. In the star type such as a PON, an amplifier and a secondary device cannot be integrated. For this reason, in the case of performing optical amplification, it is performed on a telephone pole, or the laser 19a is installed at the user's home separately from the secondary device and excitation light is supplied to the upstream side of the splitter 18. Such a mode is difficult to realize. In addition, in the case of using different wavelengths for uplink optical signals and downlink optical signals as in the PON, since it is difficult to simultaneously amplify two wavelengths, respective amplifiers for the uplink wavelength and the downlink wavelength are required, and realization becomes more difficult. Moreover, the "amplifier integrated with the secondary device" in the case of the star type cannot perform amplification for other devices.

Embodiment 2

Figure 13:
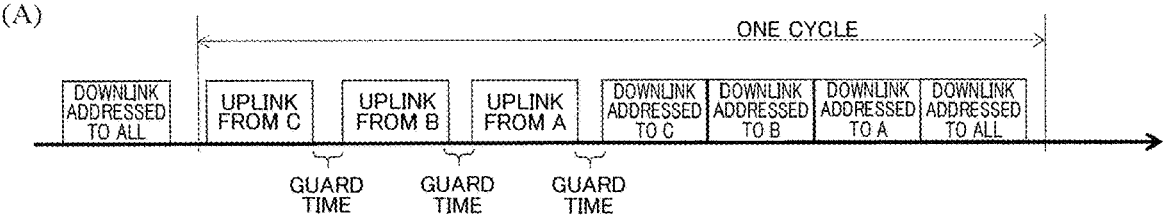
FIG. 13 illustrates time division multiplexing control performed by the communication system according to the present invention.
Figure 13:
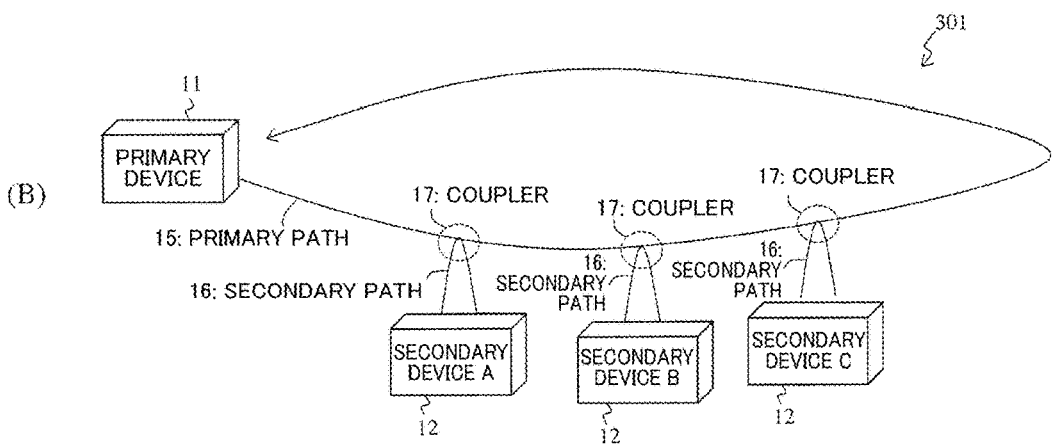

FIG. 13 illustrates time division multiplexing control performed by the communication system (301, 302). With one cycle being a time including a transmission time for transmitting, as the downlink optical signals, data addressed to each secondary device 12 and data addressed to all secondary devices 12 in time division multiplexing, reception time frames for receiving, as the uplink optical signals, data from the secondary devices 12, and guard times arranged between the receiving time frames, the primary device 11 causes the secondary devices 12 to transmit data in the reception time frames allocated to the respective secondary devices 12.

Figure 14:
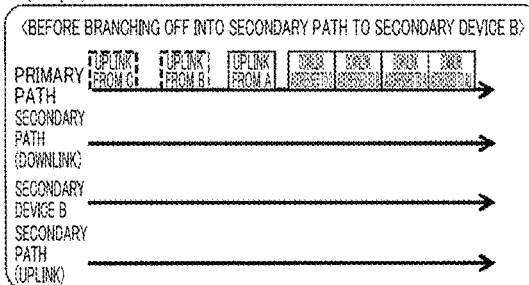
FIG. 14 is a diagram illustrating time division multiplexing control performed by the communication system according to the present invention.
Figure 14:
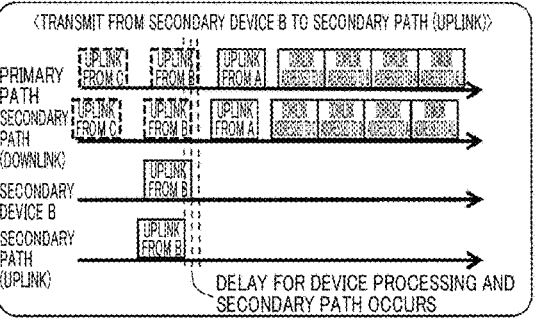
Figure 14:
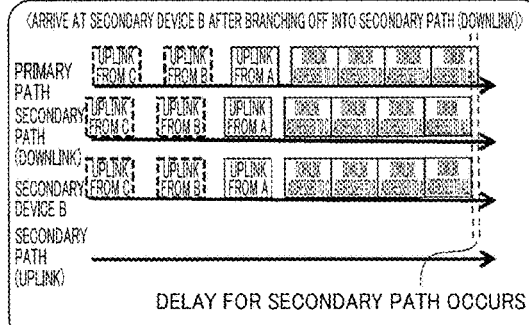
Figure 14:
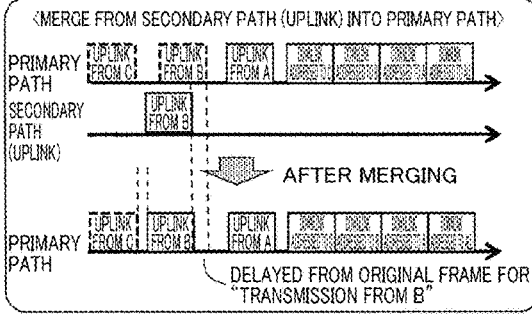

FIGS. 13(A) and 14 illustrate the case where the communication system 301 includes three secondary devices 12 (secondary devices A, B, and C) as shown in FIG. 13(B). The same applies to the case where the number of secondary devices 12 is other than three and to the communication system 302.

The communication system (301, 302) performs time division multiplexing to perform adjustment such that the communication times do not collide, as a method for distinguishing between the uplink optical signals, the downlink optical signals, and communication data of the secondary devices 12 in the aforementioned unidirectional communication. In the time division multiplexing control, there is also a method of adjusting transmission timings for the primary device and the secondary devices while also considering a delay time. However, in the present embodiment, the function is simplified to emphasize cost reduction and power consumption reduction.

Specifically, the communication system (301, 302) controls the optical signals as follows.

(1) An extra time (hereinafter, a "guard time") is secured between the time frames for the secondary devices 12 to transmit the uplink optical signals, while considering round-trip transmission delays in the secondary paths 16 and processing delays in the secondary devices 12 after the primary path 15 is branched into the secondary paths 16. The guard time may be the same time for the secondary devices. This guard time prevents the uplink optical signals from the secondary devices 12 from colliding with other optical signals when the secondary paths 16 merge into the primary path 15 (see FIG. 14).

(2) The primary device 11 successively transmits the downlink optical signals addressed to the secondary devices 12 for one cycle. The primary device 11 then waits for the time frames of the uplink optical signals from the secondary devices 12 and the respective guard times, and thereafter transmits the downlink optical signals for the next cycle. The downlink optical signals from the primary device 11 reach all secondary devices 12. Each secondary device 12 only receives the downlink optical signal addressed thereto, of the reached downlink optical signals. Also, each secondary device 12 transmits, at a timing (time frame) allocated thereto, an uplink optical signal addressed to the primary device 11. The primary device 11 only receives the uplink optical signals from the secondary devices 12, of the optical signals reached from the primary path 15 (both the uplink optical signals and the downlink optical signals reach).

(3) Note that there is also a method in which every time a downlink optical signal of one cycle passes through the optical coupler 17 connected to each secondary device 12, an uplink optical signal is simply added to the subsequent signal, and a downlink optical signal of the next one cycle is transmitted after the added uplink optical signal has returned to the primary device 11. This method can further simplify the function. However, this method cannot be applied to a configuration such as that of the communication system 302.

FIG. 14 is a diagram illustrating transition of frames (optical signals) in the vicinity of the secondary device B in FIG. 13(B). In FIG. 14, a broken line frame means a set time frame, and a solid line frame means that a sent optical signal exists.

FIG. 14 (Step 1) is a diagram illustrating optical signals in the primary path 15 in the vicinity of the coupler 17 for the secondary device B. An uplink optical signal output by the secondary device A is propagating following a downlink optical signal group from the primary device 11.

FIG. 14 (Step 2) is a diagram illustrating optical signals received by the secondary device B. The entire downlink optical signal group from the primary device 11 and the uplink optical signal output by the secondary device A arrive at the secondary device B. The secondary device B only receives optical signals addressed thereto, and discards the other optical signals. Note that since these optical signals propagate through the secondary path 16, a delay for the secondary path 16 occurs.

FIG. 14 (Step 3) is a diagram illustrating an uplink optical signal transmitted by the secondary device B in response to the received downlink optical signal. The time when the secondary device B transmits the uplink optical signal delays from the time of receiving the downlink optical signal due to signal processing. Furthermore, since this uplink optical signal propagates through the secondary path 16, a delay for the secondary path 16 occurs before the uplink optical signal arrives at the primary path 15.

FIG. 14 (Step 4) is a diagram illustrating optical signals in the primary path 15 in the vicinity of the coupler 17 for the secondary device B. The uplink optical signal from the secondary device B delays from the expected time frame and then merges into the primary path 15 due to the delay that has occurred in Steps 1 to 3. Since the guard times are provided between the time frames for the uplink optical signals that are set for the secondary devices, the delayed uplink optical signal from the secondary device B does not collide with the time frame for the following uplink optical signal of the secondary device C.

Here, signal processing performed by the secondary device B will be described.
(1) The Secondary Device B Sequentially Reads arriving Frames (Optical Signals).

If a frame is a downlink optical signal, the secondary device B performs the following processing.

In the case of an optical signal addressed to all secondary devices, the secondary device B receives, from this optical signal, the total amount of the downlink optical signal and the time frame (which may be fixed as a system) of an uplink optical signal for each secondary device. On the other hand, in the case of optical signals addressed to the respective secondary devices, the secondary device B receives an optical signal addressed thereto and discards the optical signals addressed to the other devices.

If a frame is an uplink optical signal, this optical signal is not necessary, and therefore the secondary device B discards the signal
(2) The Secondary Device B Transmits a Frame (Uplink Optical Signal.

The timing of transmitting the frame is calculated as follows. (Total amount of the downlink optical signal)+ (number (1) of secondary devices that are present before the turn (second) of the secondary device B)×time frame The secondary device B further determines the timing while also considering the guard times. The uplink optical signal to be transmitted is shaped in the time frame of the reception.

Embodiment 3

Figure 15:
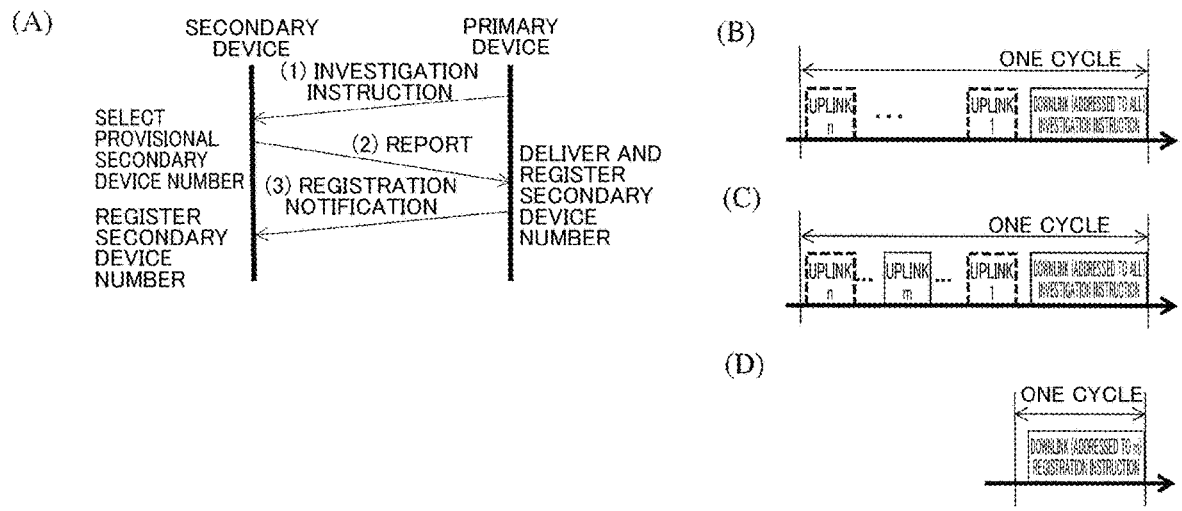
FIG. 15 illustrates automatic registration performed by the communication system according to the present invention.

FIG. 15 illustrates a secondary device registration operation performed by the communication system (301, 302).

Although the secondary devices may be manually registered, the primary device 11 can also regularly perform discovery to newly register an unregistered secondary device as shown in FIG. 15(A).

(1) The Primary Device 11 Issues an Investigation Instruction.

The primary device 11 notifies all secondary devices of an "instruction to report if unregistered" as the investigation instruction, and the maximum number of secondary devices that can be accommodated in the communication system (301, 302) (which is calculated based on the loss or the like and registered to the primary device 11 in advance). The number of time frames for uplink optical signals is the maximum number of secondary devices (n). As with a normal optical signal, the primary device 11 also transmits the "total amount of the downlink optical signal" and the "time frame for an uplink optical signal for each secondary device". FIG. 15(B) is a diagram illustrating the frame content of the investigation instruction. (2) An unregistered secondary device makes a report.

An unregistered secondary device receives the "instruction" and the maximum number of secondary devices "n" from the aforementioned investigation instruction. The unregistered secondary device selects a random integer (which is denoted as m) in the range of "n" or less, and this random number is a "provisional secondary device number". The unregistered secondary sends a report frame indicating the unregistered state within a frame of the "provisional secondary device number", of the time frames for uplink optical signals. As with a normal optical signal, the transmission timing is calculated using the "total amount of the downlink optical signal" and the "time frame for each secondary device", but the "provisional secondary device number" is used as the secondary device number. FIG. 15(C) is a diagram illustrating the frame content of the report. (3) The primary device 11 registers the secondary device.

Based on the report from the unregistered secondary device, the primary device 11 selects an available number in a secondary device number list and delivers the selected number as a "secondary device number" for the unregistered secondary device. The primary device 11 gives the "secondary device number" as a registration notification addressed to the secondary device with the "provisional secondary device number". FIG. 15(D) is a diagram illustrating the frame content of the registration notification. (4) The unregistered secondary device receives the registration notification and registers the "secondary device number" to itself. Thereafter, this secondary device receives downlink communication addressed to the above "secondary device number" and transmits uplink optical signals using a time frame for uplink communication for this "secondary device number".

Note that the present method for automatic registration is effective regardless of the presence or absence of already-registered secondary devices and the number of secondary devices to be newly registered. If the randomly-selected m duplicates an already-existing device, the transmission fails, but re-registration is attempted in accordance with the next investigation instruction, as with a PON.

Embodiment 4

In the communication system (301, 302), the intensity of optical signals arriving at each device varies because there are a plurality of transmission sources of the optical signals. Although a communication network in which high-speed communication is performed requires a gain control function to support high-speed communication, the communication system (301, 302) is equipped with a simple gain control function in order to emphasize cost reduction.

Figure 16:
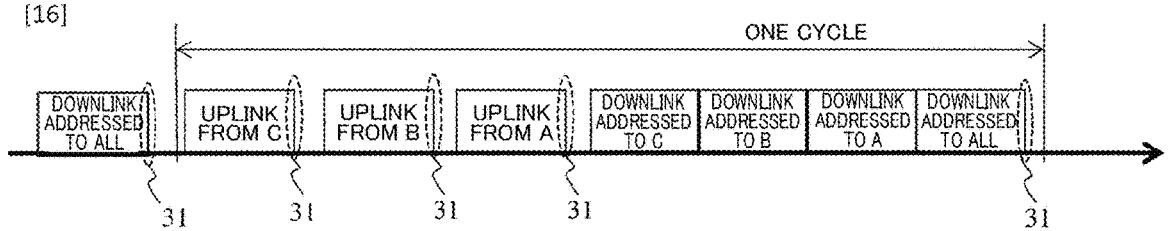
FIG. 16 is a diagram illustrating automatic gain control performed by the communication system according to the present invention.

FIG. 16 is a diagram illustrating the gain control performed by the communication system (301, 302). This diagram shows an example of frames (optical signals) on the primary path 15 before arriving at the primary device 11. The primary device 11 and the secondary devices 12 adjust reception gain based on the uplink optical signals and the downlink optical signals, respectively. Specifically, in order to secure the reading time (response time) corresponding to the variation in the optical signal intensity, signal strings 31, which are not for communication purposes but only for intensity adjustment, are inserted at the beginning of the uplink optical signals transmitted by the secondary devices 12 and at the beginning of the downlink optical signal group transmitted by the primary device 11. The signal strings 31 may be dummy signals since the signal strings 31 need only secure the response time.

Embodiment 5

Figure 17:
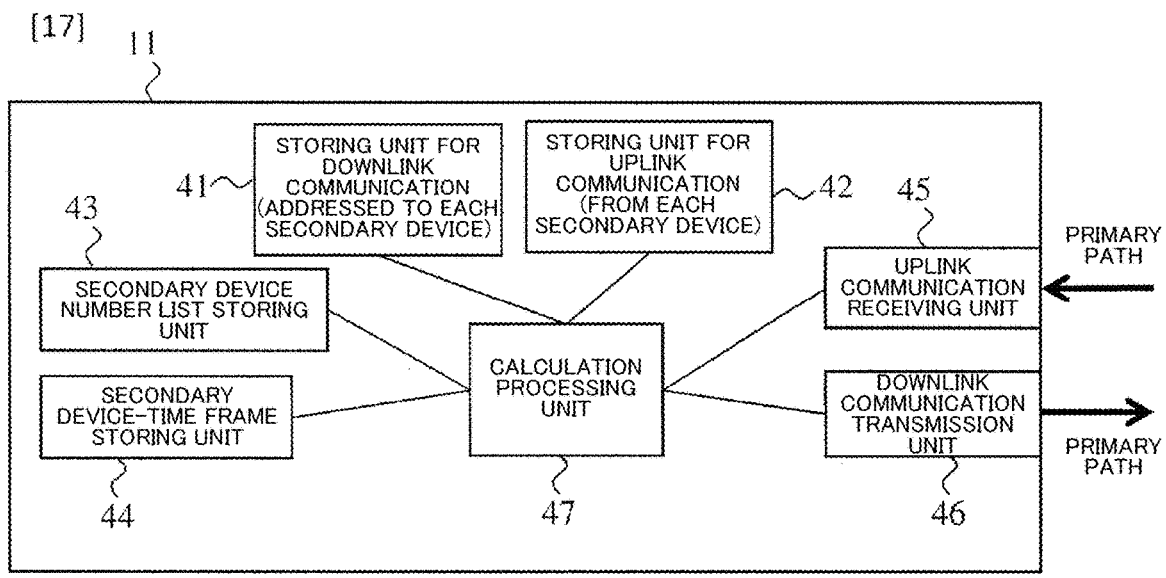
FIG. 17 is a diagram illustrating a primary device included in the communication system according to the present invention.

FIG. 17 is a diagram illustrating the primary device 11. The primary device 11 is a communication device that communicates with each secondary device, and includes: an uplink communication receiving unit 45 that a downlink optical signal transmitted by the primary device 11 and an uplink optical signal from each secondary device reach from the primary path; a downlink communication transmission unit 46 that transmits, to the primary path, a downlink optical signal addressed to each secondary device; a storing unit 41 for uplink communication (from each secondary device) that stores data of the uplink optical signal received from each secondary device; a storing unit 42 for downlink communication (addressed to each secondary device) that stores data of the downlink optical signal transmitted to each secondary device; a secondary device number list storing unit 43 that stores a list of the secondary device numbers of the secondary devices; a secondary device-time frame storing unit 44 that stores a time frame that can be used for the uplink optical signal from each secondary device; and a calculation processing unit 47 that has the following communication means in downlink and downlink communication.

When transmitting a downlink optical signal, the calculation processing unit 47 retrieves data of the downlink optical signal for the corresponding cycle from the storing unit 41 for downlink communication (addressed to each secondary device), calculates the total downlink communication volume, retrieves a time frame from the secondary device-time frame storing unit 44, arranges the data of the downlink optical signal addressed to each secondary device following the total downlink communication volume and the time frame, and transmits these data to the downlink communication transmission unit 46, and transitions to downlink communication transmission processing for the next cycle after waiting for the time frame for the uplink optical signal from each secondary device and the guard time thereof.

Also, when receiving an uplink optical signal, the calculation processing unit 47 only receives uplink communication from the optical signals received by the uplink communication receiving unit 45, separates the uplink communication for respective secondary devices and stores the separated uplink communication in the storing unit 42 for uplink communication (from each secondary device), and transitions to signal processing for the next cycle.

Figure 18:
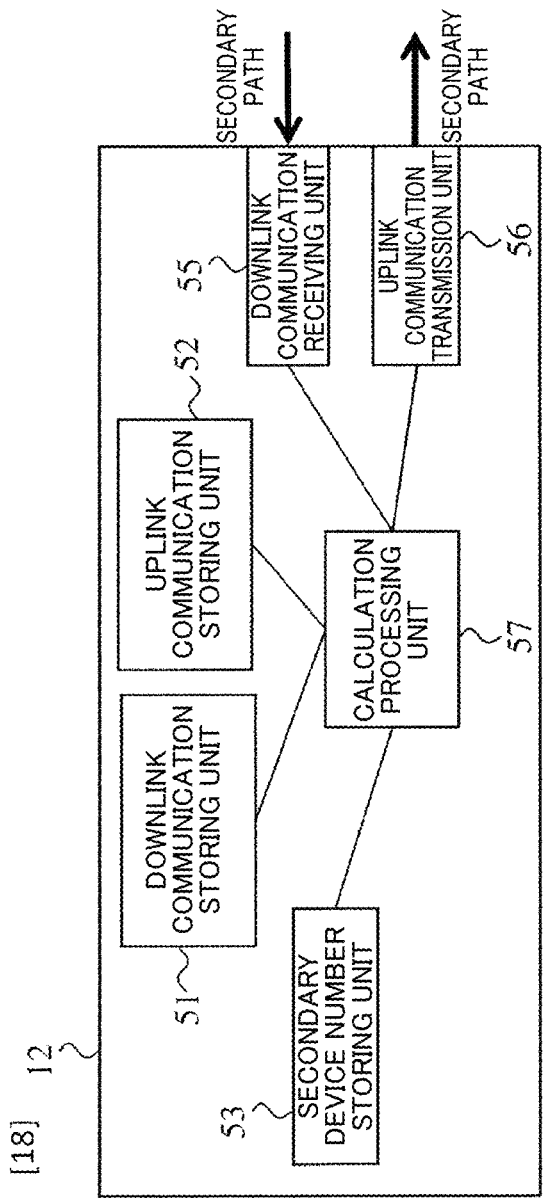

FIG. 18 is a diagram illustrating the secondary device 12. The secondary device 12 is a communication device that communicates with the primary device 11, and includes: an uplink communication transmission unit 56 that transmits an uplink optical signal addressed to the primary device 11 to the secondary path; a downlink communication receiving unit 55 that receives, from the secondary path, a downlink optical signal from the primary device 11 and an uplink optical signal transmitted by each secondary device; an uplink communication storing unit 52 that stores data of the uplink optical signal to be transmitted to the primary device 11; a downlink communication storing unit 51 that stores data of the downlink optical signal received from the primary device 11; a secondary device number storing unit 53 that stores a secondary device number of the corresponding secondary device; and a calculation processing unit 57 that has the following communication means in downlink and downlink communication.

The calculation processing unit 57 acquires, from a downlink optical signals addressed to all secondary devices, the total amount of the downlink optical signal and the time frame for each secondary device, receives data of a downlink optical signal addressed to the corresponding secondary device, stores the received data in the downlink communication storing unit 51, retrieves data for one cycle in accordance with the time frame amount from the uplink communication storing unit 52, calculates the transmission timing of the corresponding secondary device while considering the total amount of downlink communication, the time frames corresponding to the number of secondary devices that are present before the device number of the corresponding secondary device, and the guard times, and holds the data until the transmission timing, and transitions to signal processing for the next cycle.

Figure 19:
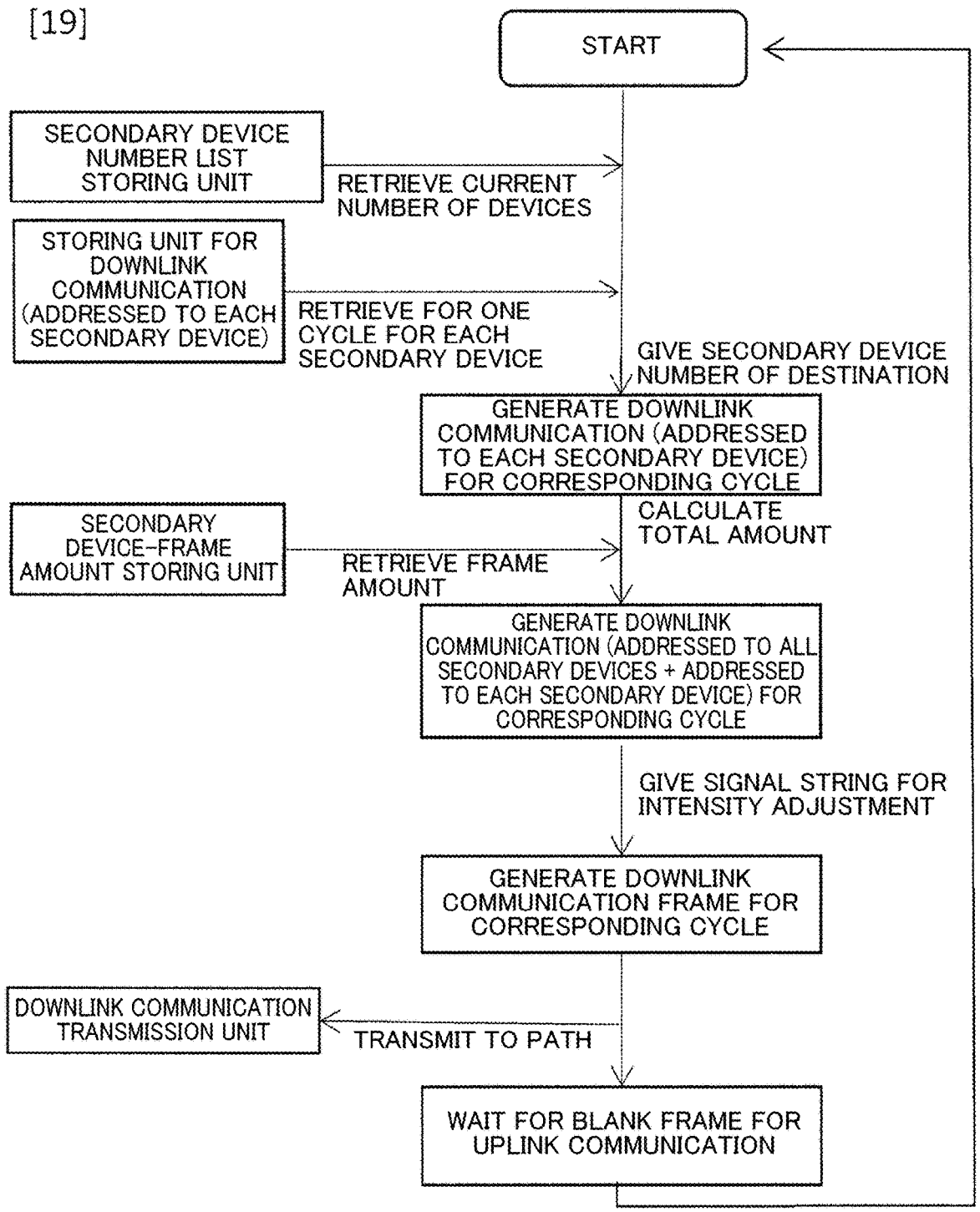
FIG. 19 is a diagram illustrating a transmission operation of the primary device included in the communication system according to the present invention.

FIG. 19 is a flowchart illustrating the method by which the primary device 11 transmits a downlink optical signal.
- (Step 11) The current number of secondary devices is retrieved from the secondary device number list storing unit 43.
- (Step 12) Data for the downlink optical signal in the corresponding cycle is retrieved from the storing unit 41 for downlink communication (addressed to each secondary device).
- (Step 13) The secondary device number of the destination device is given to the downlink data addressed to each secondary device number.
- (Step 14) The total amount of the downlink optical signal in this cycle is calculated.
- (Step 15) A time frame is retrieved from the secondary device-time frame storing unit 44.
- (Step 16) As downlink communication, the downlink data addressed to each secondary device is arranged following the total downlink communication volume addressed to all secondary devices and the time frame for each secondary device.
- (Step 17) A signal string for intensity adjustment is given to the beginning of each downlink data string.
- (Step 18) These data strings are transmitted as a downlink optical signal from the downlink communication transmission unit 46 to the primary path.
- (Step 19) After waiting for the time frame for the uplink optical signal from each secondary device and the guard time thereof, the processing transitions to downlink optical signal transmission processing for the next cycle.

Figure 20:
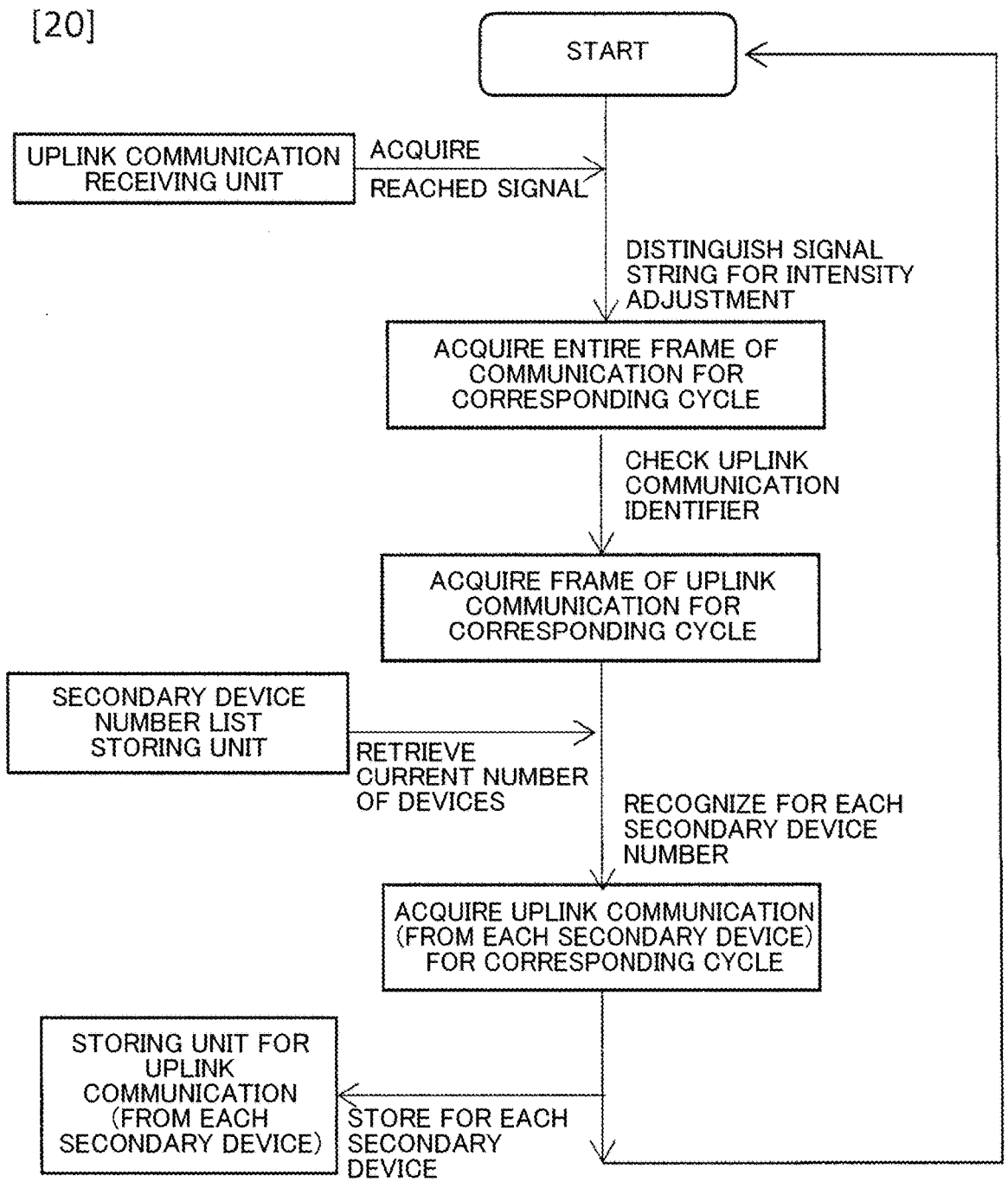
FIG. 20 is a diagram illustrating a receiving operation of the primary device included in the communication system according to the present invention.

FIG. 20 is a flowchart illustrating a method by which the primary device 11 receives an uplink optical signal.
- (Step 21) Data of a received optical signal is acquired from the uplink communication receiving unit 45.
- (Step 22) A signal string for intensity adjustment is not recognized as data, but is only used for reception intensity adjustment.
- (Step 23) Only data with an uplink communication identifier is received.
- (Step 24) The current number of devices is retrieved from the secondary device number list storing unit 43, and uplink data is recognized for each secondary device number.
- (Step 25) This data is stored for each secondary device in the storing unit 42 for uplink communication (from each secondary device).
- (Step 26) The processing transitions to optical signal reception processing for the next cycle.

Figure 21:
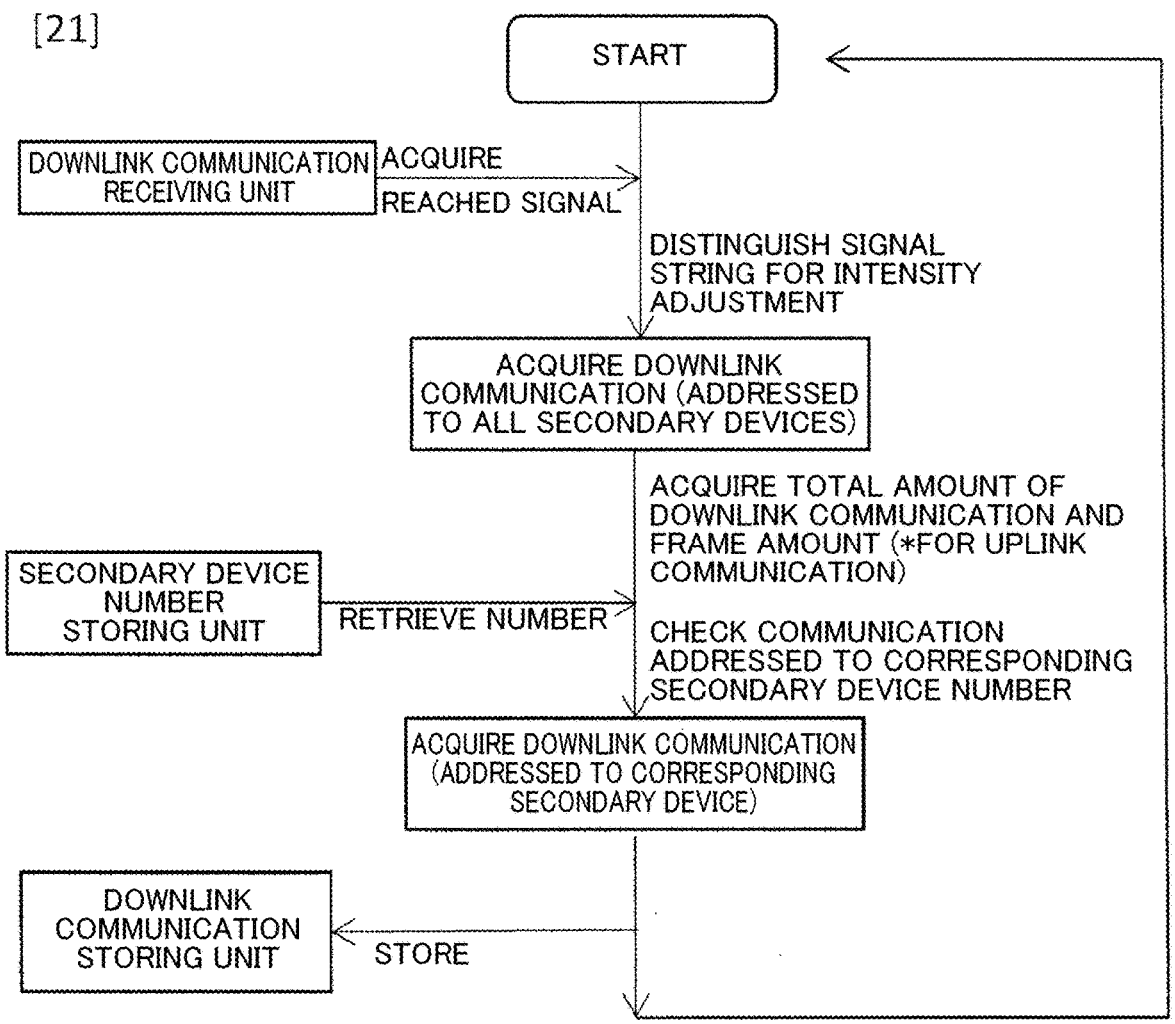
FIG. 21 is a diagram illustrating a receiving operation of the secondary device included in the communication system according to the present invention.

FIG. 21 is a flowchart illustrating a method by which the secondary device 12 receives a downlink optical signal.
- (Step 31) Data included in an optical signal is acquired from the downlink communication receiving unit 55.
- (Step 32) A signal string for intensity adjustment is not recognized as data, but is only used for reception intensity adjustment.
- (Step 33) The total amount of the downlink optical signal and the time frame for each secondary device are acquired from downlink communication addressed to all secondary devices.
- (Step 34) The corresponding secondary device number is retrieved from the secondary device number storing unit 53.
- (Step 35) Data addressed to the corresponding secondary device number is checked from downlink data addressed to the respective secondary device numbers.
- (Step 36) This data is stored in the downlink communication storing unit 51.
- (Step 37) The processing transitions to downlink optical signal reception processing for the next cycle.

Figure 22:
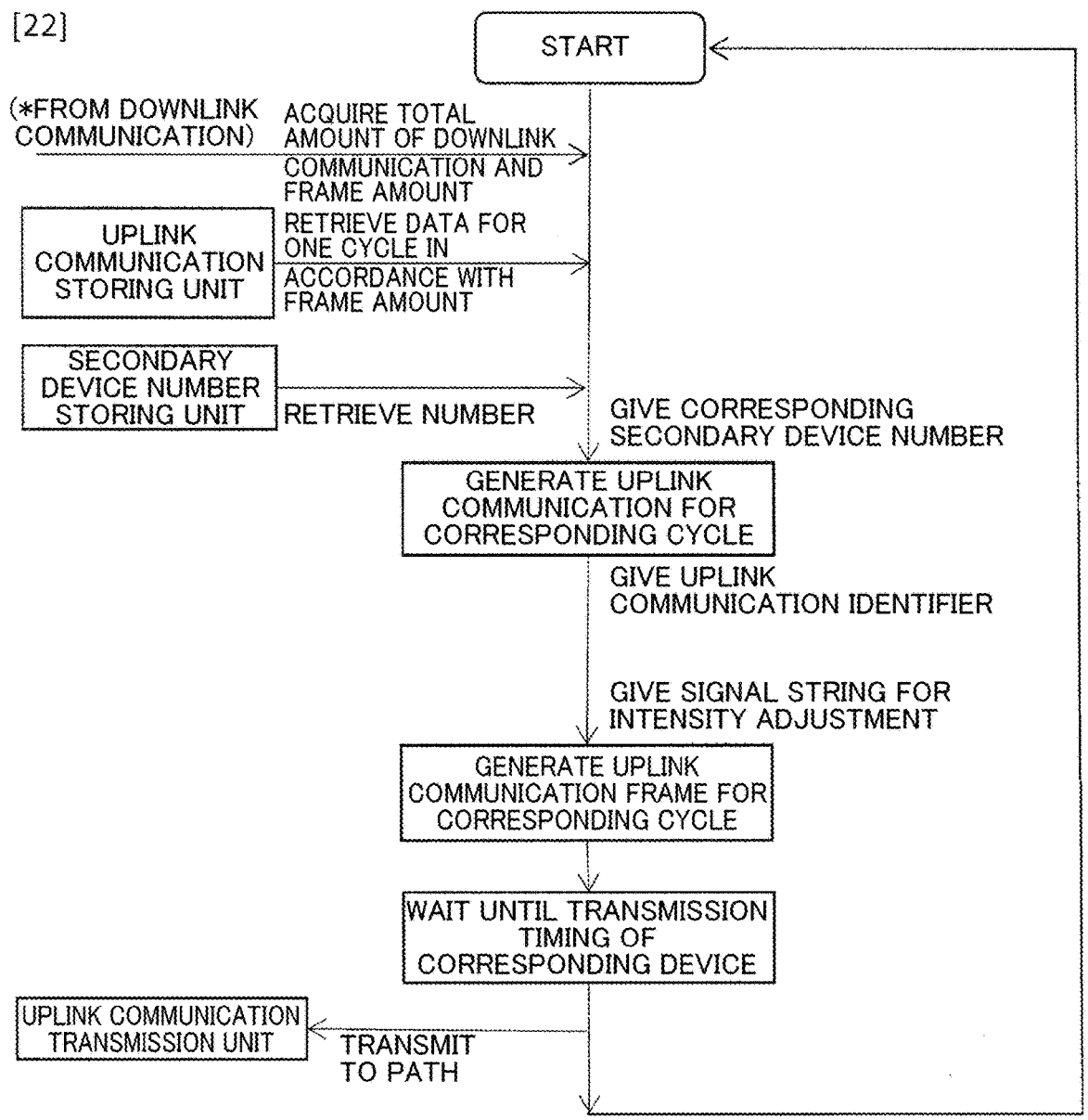
FIG. 22 is a diagram illustrating a transmission operation of the secondary device included in the communication system according to the present invention.

FIG. 22 is a flowchart illustrating a method by which the secondary device 12 transmits an uplink optical signal.
- (Step 41) The total amount of downlink communication and the time frame for each secondary device are acquired from downlink communication addressed to all devices.
- (Step 42) Data for one cycle is retrieved from the uplink communication storing unit 52 in accordance with the corresponding time frame.
- (Step 43) The corresponding secondary device number is retrieved from the secondary device number storing unit 53.
- (Step 44) The corresponding secondary device number is given to uplink data.
- (Step 45) An uplink communication identifier is given to the uplink data.
- (Step 46) A signal string for intensity adjustment is given to the beginning of the uplink data.
- (Step 47) The transmission timing of the corresponding secondary device is calculated while considering the total amount of the downlink optical signal, the time frames corresponding to the number of secondary devices that are present before the device number of the corresponding secondary device, and the guard times, and the transmission timing is waited for.
- (Step 48) The uplink optical signal is transmitted from the uplink communication transmission unit 56.

(Step 49) The processing transitions to uplink optical signal transmission processing for the next cycle.

REFERENCE SIGNS LIST

11 Primary device
12 Secondary device
15 Primary path
16 Secondary path
17 Coupler
18 Splitter
19 Optical amplifier
19a Laser
19b Fiber amplifier
21 Transmitting/receiving unit
31 Signal string
41 Storing unit for downlink communication (addressed to each secondary device)
42 Storing unit for uplink communication (from each secondary device)
43 Secondary device number list storing unit
44 Secondary device-time frame storing unit
45 Uplink communication receiving unit
46 Downlink communication transmission unit
47 Calculation processing unit
51 Downlink communication storing unit
52 Uplink communication storing unit
53 Secondary device number storing unit
55 Downlink communication receiving unit
56 Uplink communication transmission unit
57 Calculation processing unit
301, 302 Communication system

The invention claimed is:

1. A communication system comprising:
a primary path having one first end and one second end to form a primary optical fiber ring;
one primary device that transmits a downlink optical signal to the first end of the primary path, and receives an uplink optical signal together with the downlink optical signal from the second end of the primary path;
a first splitter provided at a first point of the primary path;
a second splitter provided at a second point of the primary path;
a plurality of primary sub-paths having first sub-path ends and second sub-path ends, wherein the first sub-path ends are connected to the first splitter and the second sub-path ends are connected to the second splitter to form a plurality of primary optical fiber sub-rings, and the plurality of primary sub-paths branch out from the primary path via the first and second splitters;
a plurality of optical couplers provided at intermediate points of the primary path and the plurality of primary sub-paths;
a plurality of secondary paths connected to the plurality of optical couplers, respectively; and
a plurality of secondary devices connected to the primary path and the plurality of primary sub-paths via the plurality of optical couplers and the plurality of secondary paths,
wherein the plurality of primary optical fiber sub-rings share same parts of the primary optical fiber ring adjacent to the one primary device for optical signal communications between the one primary device and the plurality of secondary devices connected to the plurality of primary sub-paths, and
wherein, with one cycle being a time including a transmission time for transmitting, as the downlink optical signal, data addressed to each of the plurality of secondary devices and data addressed to every secondary device of the plurality of secondary devices in time division multiplexing, reception time frames for receiving, as the uplink optical signal, data from the plurality of secondary devices, and a guard time arranged between the reception time frames,
the one primary device causes each of the plurality of secondary devices to transmit data in a corresponding reception time frame of the reception time frames allocated thereto.

2. The communication system according to claim 1, wherein the primary path has, at a portion thereof, an optical fiber amplifier.

3. The communication system according to claim 1, wherein the one primary device regularly performs discovery to newly register a new secondary device that is unregistered as one of the plurality of secondary devices.

4. The communication system according to claim 1, wherein the one primary device and the plurality of secondary devices respectively adjust reception gain based on the uplink optical signal and the downlink optical signal.

5. A communication method comprising:
transmitting a downlink optical signal to a first end of a primary path, by one primary device;
receiving the downlink optical signal from a second end of the primary path, the primary path forming a primary optical fiber ring;
branching out the downlink optical signal to a plurality of primary sub-paths via a first splitter
transmitting an uplink optical signal corresponding to the downlink optical signal to the primary path by a plurality of secondary devices, some of the plurality of secondary devices being respectively connected to:
the primary path via a plurality of optical couplers and a plurality of secondary paths; and
the plurality of primary sub-paths via the plurality of optical couplers and the plurality of secondary paths, the uplink optical signal from the plurality of primary sub-paths merging into the primary path via a second splitter, wherein the plurality of primary sub-paths have first sub-path ends and second sub-path ends, the first sub-path ends are connected to the first splitter and the second sub-path ends are connected to the second splitter to form a plurality of primary optical fiber sub-rings, and the plurality of primary sub-paths branch out from the primary path via the first and second splitters; and
receiving the uplink optical signal together with the downlink optical signal from the second end of the primary path by the one primary device,
wherein the plurality of primary optical fiber sub-rings share same parts of primary optical fiber ring adjacent to the one primary device for optical signal communications between the one primary device and the plurality of secondary devices connected to the plurality of primary sub-paths, and
wherein, with one cycle being a time including a transmission time for transmitting, as the downlink optical signal, data addressed to each of the plurality of secondary devices and data addressed to every secondary device of the plurality of secondary devices in time division multiplexing, reception time frames for receiving, as the uplink optical signal, data from the plurality of secondary devices, and a guard time arranged between the reception time frames, the one primary device causes each of the plurality of secondary devices to transmit data in a corresponding reception time frame of the reception time frames allocated thereto.

6. The communication method according to claim 5, wherein the primary path has, at a portion thereof, an optical fiber amplifier.

7. The communication method according to claim 5, wherein the one primary device regularly performs discovery to newly register a new secondary device that is unregistered as one of the plurality of secondary devices.

8. The communication method according to claim 5, wherein the one primary device and the plurality of secondary devices respectively adjust reception gain based on the uplink optical signal and the downlink optical signal.

* * * * *